United States Patent
Lin et al.

(10) Patent No.: US 11,971,368 B2
(45) Date of Patent: Apr. 30, 2024

(54) DETERMINATION METHOD, ELIMINATION METHOD AND APPARATUS FOR ELECTRON MICROSCOPE ABERRATION

(71) Applicant: SOUTH CHINA AGRICULTURAL UNIVERSITY, Guangdong (CN)

(72) Inventors: Fang Lin, Guangdong (CN); Qi Zhang, Guangdong (CN); Chen Wang, Guangdong (CN)

(73) Assignee: SOUTH CHINA AGRICULTURAL UNIVERSITY, Guangdong (CN)

( * ) Notice: Subject to any disclaimer, the term of this patent is extended or adjusted under 35 U.S.C. 154(b) by 435 days.

(21) Appl. No.: 17/331,393

(22) Filed: May 26, 2021

(65) Prior Publication Data
US 2021/0286972 A1 Sep. 16, 2021

Related U.S. Application Data

(63) Continuation of application No. PCT/CN2020/093517, filed on May 29, 2020.

(30) Foreign Application Priority Data

May 31, 2019 (CN) .......................... 201910468108.6

(51) Int. Cl.
*G06K 9/00* (2022.01)
*G01N 23/04* (2018.01)
(Continued)

(52) U.S. Cl.
CPC ......... *G01N 23/04* (2013.01); *G01N 23/2251* (2013.01); *G06F 18/214* (2023.01);
(Continued)

(58) Field of Classification Search
CPC .. G01N 23/04; G01N 23/2251; G06F 18/214; G06F 18/232; G06T 7/0002;
(Continued)

(56) References Cited

U.S. PATENT DOCUMENTS 7,234,810 B2 6/2007 Warden et al.
7,497,573 B2 3/2009 Warden et al.
(Continued)

FOREIGN PATENT DOCUMENTS

CN 101520413 9/2009
CN 109164591 1/2019
(Continued)

OTHER PUBLICATIONS

International Search Report, issued in the corresponding PCT application No. PCT/CN2020/093517, dated Aug. 27, 2020, 8 pages (translation enclosed).
(Continued)

*Primary Examiner* — Jonathan S Lee
(74) *Attorney, Agent, or Firm* — HSML P.C.

(57) ABSTRACT

The present disclosure provides a determination method, an elimination method and an apparatus for an electron microscope aberration. The determination method comprises: training a neural network for image recognition using a plurality of electron microscope simulation images to obtain an electron microscope image recognition model; recognizing an electron microscope image of an experimental sample using the electron microscope image recognition model to obtain the electron microscope simulation image corresponding to the electron microscope image of the experimental sample; and obtaining the corresponding set aberration as an imaging aberration of the electron microscope image of the experimental sample according to the electron microscope simulation image corresponding to the electron microscope image of the experimental sample. Through the above solution, an aberration value of an electron microscope can be obtained using a lattice image of the experimental sample, thereby improving an imaging effect of the electron microscope.

14 Claims, 2 Drawing Sheets

(51) Int. Cl.

| | |
|---|---|
| *G01N 23/2251* | (2018.01) |
| *G06F 18/214* | (2023.01) |
| *G06F 18/232* | (2023.01) |
| *G06T 7/00* | (2017.01) |
| *G06V 10/764* | (2022.01) |
| *G06V 10/82* | (2022.01) |
| *G06V 20/69* | (2022.01) |

(52) U.S. Cl.
CPC .......... *G06F 18/232* (2023.01); *G06T 7/0002* (2013.01); *G06V 10/764* (2022.01); *G06V 10/82* (2022.01); *G06V 20/695* (2022.01); *G06V 20/698* (2022.01); *G06T 2207/10061* (2013.01); *G06T 2207/20084* (2013.01); *G06T 2207/30168* (2013.01)

(58) Field of Classification Search
CPC . G06T 2207/10061; G06T 2207/20084; G06T 2207/30168; G06V 10/764; G06V 10/82; G06V 20/695; G06V 20/698
USPC ........................................................ 382/157
See application file for complete search history.

(56) References Cited

U.S. PATENT DOCUMENTS

| | | |
|---|---|---|
| 8,002,407 B2 | 8/2011 | Warden et al. |
| 8,636,359 B2 | 1/2014 | Warden et al. |
| 10,127,652 B2 * | 11/2018 | Gao ........................ G06T 7/001 |
| 2005/0105048 A1 | 5/2005 | Warden et al. |
| 2007/0153232 A1 | 7/2007 | Warden et al. |
| 2009/0251663 A1 | 10/2009 | Warden et al. |
| 2011/0273666 A1 | 11/2011 | Warden et al. |
| 2019/0287230 A1* | 9/2019 | Lu .......................... G06N 3/088 |
| 2021/0334946 A1* | 10/2021 | Buzaglo ............ G01N 21/9501 |

FOREIGN PATENT DOCUMENTS

| | | |
|---|---|---|
| CN | 109558904 | 4/2019 |
| CN | 110231360 | 9/2019 |

OTHER PUBLICATIONS

First Chinese Office Action and Search Report, issued in the corresponding Chinese patent application No. 201910468108.6, dated Jan. 10, 2020, 15 pages (translation enclosed).

Supplementary Search Report, issued in the corresponding Chinese patent application No. 201910468108.6, dated May 17, 2020, 3 pages (translation enclosed).

Lin et al., "Exit-wave phase retrieval from a single high-resolution transmission electron microscopy image of a weak-phase object", Micron, vol. 114, Nov. 2018, pp. 23-31.

Madsen, et al., "A Deep Learning Approach to Identify Local Structures in Atomic-Resolution Transmission Electron Microscopy Images", Advanced Theory and Simulation, dated Jul. 3, 2018, 12 pages.

* cited by examiner

DETERMINATION METHOD, ELIMINATION METHOD AND APPARATUS FOR ELECTRON MICROSCOPE ABERRATION

This application is a continuation of International Application No. PCT/CN2020/093517, filed on May 29, 2020, which claims priority to Chinese Patent Application No. 201910468108.6 filed on May 31, 2019, both of which are hereby incorporated by reference in their entireties.

TECHNICAL FIELD

The present disclosure relates to a technical field of electron imaging, and in particular to a determination method, an elimination method and an apparatus for an electron microscope aberration.

BACKGROUND ART

There are mainly three imaging modes for a transmission electron microscope: a scanning transmission imaging mode, a high-resolution imaging (bright field image) mode and a convergent beam imaging mode.

An aberration corrector installed in the transmission electron microscope separately adjusts for a collecting lens and an objective lens. The adjustment for the collecting lens is to make incident electron beams as ideal incident spots as far as possible, i.e., circular dots with symmetrical geometries, in the scanning transmission imaging mode. The adjustment for the objective lens is made for the high-resolution imaging (bright-field image) mode, in which a plane wave (ideal case) incident on a surface of a sample interacts with the sample so that a function of an emergent electron wave contains information of the sample, and then a magnification is made by the objective lens for imaging. A Cs-corrector adjusts current related to the objective lens, and after being amplified, the electron wave is recorded by a Charge-coupled Device (CCD) for imaging. An aberration includes a spherical aberration, an astigmatism, etc.

When a high-resolution electron microscopy image is shot by the transmission electron microscope, it is necessary to adjust the Cs-corrector to make an electron microscope aberration as small as possible, so as to achieve an optimal imaging effect.

At present, an aberration measurement is only made for a non-crystal area. The specific implementation is that an electron microscope controls incident directions of incident electron beams to deviate from an optical axis, and to rotate for a circle around the optical axis with a certain deviation amplitude to obtain several images of noncrystal when the electron beams are in symmetrical positions. Through numerical values of and symmetry relationships between various orders of aberrations, the numerical values of all the aberrations can be calculated by a formula.

The measurement methods all rely on the measurement of noncrystal to obtain parameters of the electron microscope. In the measurement, in case of a low-order aberration, a calculation for example of Cs, A1 or a focal length can be made by fitting shapes of non-crystal rings; and in case of other aberrations, such as A2, B2, A3, S3, A4, D4, B4, C5, and A5, a calculation is made by using the images of noncrystal.

If there is no noncrystal on the sample for the experiment, it is necessary to adjust the electron microscope by replacing the sample. If there is noncrystal on the sample to be measured, it is necessary to complete aberration measurement and adjustment in the non-crystal area, and then move a crystal area into the visual field for shooting.

However, when a resolution of a studied crystal structure reaches an atomic scale, e.g., when a high-resolution image needs to be observed, the current aberration value measurement method cannot meet the imaging effect requirement of the transmission electron microscope.

SUMMARY OF THE DISCLOSURE

The present disclosure provides a determination method, an elimination method and an apparatus for an electron microscope aberration, so as to improve an imaging effect of an electron microscope.

In order to achieve the above objective, the present disclosure is implemented with the following solutions:

According to one aspect of the embodiments of the present disclosure, there is provided a method for determining an electron microscope aberration, comprising: training a neural network for image recognition using a plurality of electron microscope simulation images to obtain an electron microscope image recognition model, wherein each of the electron microscope simulation images is corresponding to a respective set aberration; recognizing an electron microscope image of an experimental sample using the electron microscope image recognition model to obtain the electron microscope simulation image corresponding to the electron microscope image of the experimental sample, wherein the electron microscope simulation image and the electron microscope image of the experimental sample are both images of set type; and obtaining the corresponding set aberration as an imaging aberration of the electron microscope image of the experimental sample according to the electron microscope simulation image corresponding to the electron microscope image of the experimental sample.

In some embodiments, training a neural network for image recognition using a plurality of electron microscope simulation images to obtain an electron microscope image recognition model comprises: performing feature extraction on the electron microscope simulation images to obtain image features; performing cluster analysis on all of the image features to classify all of the electron microscope simulation images; the classified electron microscope simulation images being corresponding to respective categories; and training the neural network for image recognition using the classified electron microscope simulation images based on set network parameters, set network hyper-parameters and a set loss function, to obtain the electron microscope image recognition model.

In some embodiments, before training the neural network for image recognition using the classified electron microscope simulation images based on set network parameters, set network hyper-parameters and a set loss function, to obtain the electron microscope image recognition model, the method further comprises: performing parameter transfer on network parameters trained based on an ImageNet data set for the images of set type to obtain the set network parameters.

In some embodiments, performing feature extraction on the electron microscope simulation images to obtain image features comprises: performing the feature extraction on the electron microscope simulation images using the neural network based on the set network parameters, to obtain the image features.

In some embodiments, recognizing an electron microscope image of an experimental sample using the electron microscope image recognition model to obtain the electron microscope simulation image corresponding to the electron microscope image of the experimental sample comprises: performing category recognition on the electron microscope image of the experimental sample using the electron microscope image recognition model to obtain the category corresponding to the electron microscope image of the experimental sample; and performing image recognition in the category corresponding to the electron microscope image of the experimental sample using the electron microscope image recognition model to obtain the electron microscope simulation image corresponding to the electron microscope image of the experimental sample.

In some embodiments, the images of set type are high-resolution images; and/or the electron microscope simulation images are transmission electron microscope simulation images; and/or all of the electron microscope simulation images are simulation images corresponding to a same material contained in the experimental sample.

According to another aspect of the embodiments of the present disclosure, there is provided a method for eliminating an electron microscope aberration, comprising: determining an imaging aberration of an electron microscope image of an experimental sample using the method for determining the electron microscope aberration described in the above embodiments; and eliminating an aberration in the electron microscope image of the experimental sample according to the imaging aberration.

According to still another aspect of the embodiments of the present disclosure, there is provided an apparatus for determining an electron microscope aberration, comprising: a network training unit configured to train a neural network for image recognition using a plurality of electron microscope simulation images to obtain an electron microscope image recognition model, wherein each of the electron microscope simulation images is corresponding to a respective set aberration; an image recognition unit configured to recognize an electron microscope image of an experimental sample using the electron microscope image recognition model to obtain the electron microscope simulation image corresponding to the electron microscope image of the experimental sample, wherein the electron microscope simulation image and the electron microscope image of the experimental sample are both images of set type; and an aberration determination unit configured to obtain the corresponding set aberration as an imaging aberration of the electron microscope image of the experimental sample according to the electron microscope simulation image corresponding to the electron microscope image of the experimental sample.

According to still another aspect of the embodiments of the present disclosure, there is provided a computer-readable storage medium in which a computer program is stored, wherein when being executed by a processor, the program implements steps of the method in the above embodiments.

According to yet another aspect of the embodiments of the present disclosure, there is provided an electron microscope, comprising a memory, a processor, and a computer program stored in the memory and executable in the processor, wherein the processor implements steps of the method in the above embodiments.

In the method for determining the electron microscope aberration, the method for eliminating the electron microscope aberration, the apparatus for determining the electron microscope aberration, the electron microscope and the computer readable storage medium according to the present disclosure, the recognition result of the trained neural network is more accurate by training the network after performing the feature extraction on the electron microscope simulation images. By performing the clustering analysis on the images first and then training the neural network, the training of the neural network can be completed as soon as possible and the time consumed by the neural network can be reduced.

BRIEF DESCRIPTION OF THE DRAWINGS

In order to more clearly explain the technical solutions in the embodiments of the present disclosure or in the prior art, the drawings required to describe the embodiments or the prior art will be briefly introduced below. Obviously, the drawings in the following description only illustrate some embodiments of the present disclosure, and other drawings can be obtained from them by persons of ordinary skill in the art without paying any creative labor. In the drawings.

DETAILED DESCRIPTION OF THE PREFERRED EMBODIMENTS

Figure 1:
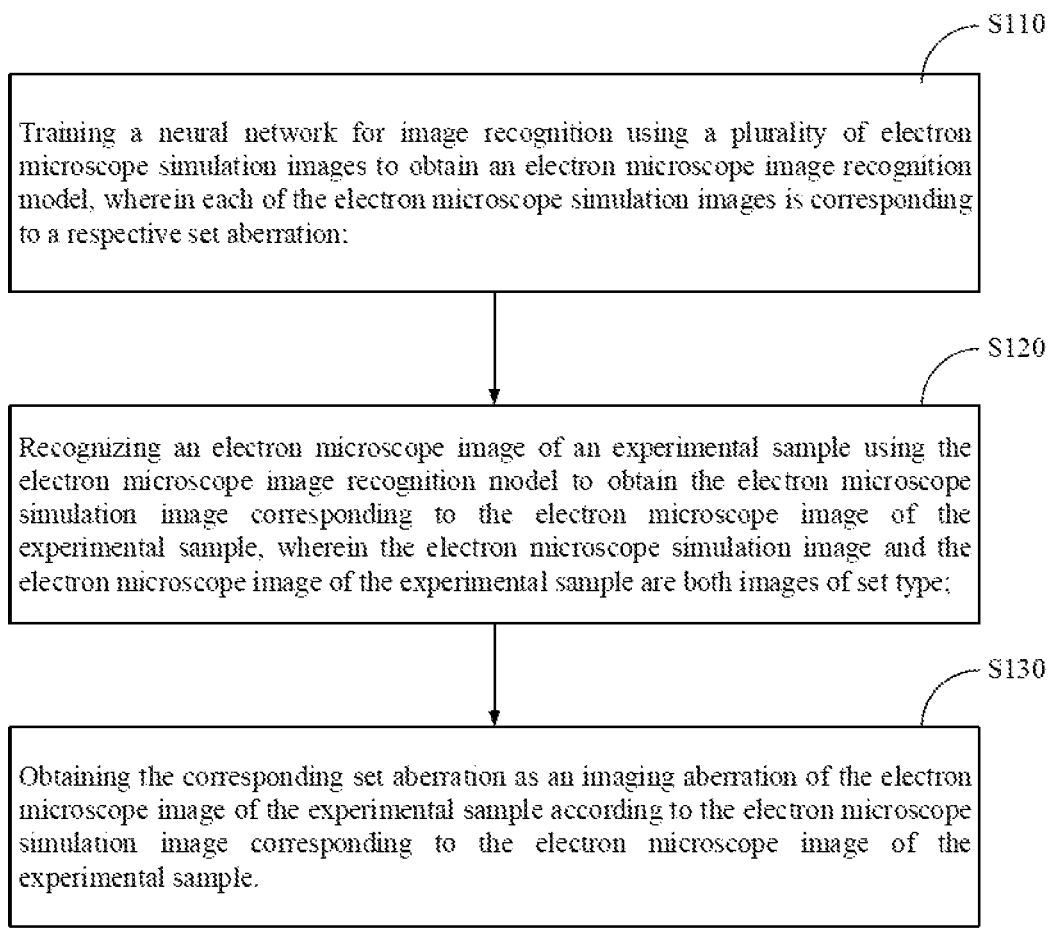
FIG. 1 is a schematic flowchart of a method for determining an electron microscope aberration according to an embodiment of the present disclosure.

In order that the objectives, technical solutions and advantages of the present disclosure are clearer, the embodiments of the present disclosure will be further described in detail as follows with reference to the drawings. Here, the illustrative embodiments of the present disclosure and the descriptions thereof are used to explain the present disclosure, rather than limitations thereto.

The current aberration value measurement method cannot meet the requirements of the electron microscope imaging effect. The inventor considers that the prior art has great defects in the calculation of the aberration with respect to the images of non-crystal part, and the detailed analysis is given as follows:

Firstly, in the field of materials science, the researchers are usually only interested in the crystal structure. For example, the lattice structure is observed to determine the material and the atomic structure thereof. For another example, the defects or the atomic micro-displacement in the lattice are observed to explain the relationships between the defects and the physical properties. However, in the case that the aberration has to be adjusted in the non-crystal area, if there is no noncrystal on the sample for the experiment, it is necessary to adjust the electron microscope by replacing the sample, and if there is noncrystal on the sample to be measured, it is necessary to complete aberration measurement and adjustment in the non-crystal area, and then move a crystal area into the visual field for shooting electron microscope images. Since the current of the objective lens of the electron microscope is unstable, it is possible that the aberration given just now has changed after the sample is replaced or moved.

Secondly, since the calculation of the aberration and the adjustment of the current of the Cs-corrector are usually carried out when shooting the images of noncrystal under the largely under-focused condition, the calculated aberration is just a value under the largely under-focused condition. When imaging is performed for the crystal part, the focal length needs to be adjusted to approach the optimal under-focus (scherzer condition) for imaging, and the aberration value will also change due to the change of the current for focusing the focus length.

Thirdly, the aberration value given by the electron microscope at present may not be accurate. When the inventor performs an image simulation using the aberration parameters provided by the electron microscope, the resultant simulation images and the experimental images are inconsistent even for the samples with a monatomic layer thickness, such as graphene, boron nitride and molybdenum disulfide, etc.

Fourthly, by observing the high-resolution image of the whole visual field area, the inventor finds that even the sample is very flat and the structure is uniform, experimental images in the areas far away from each other are quite different, because the aberration value is measured in the area near the optical axis in the measurement, and in any other area, the difference between the measured aberration value and the actual value in this area is larger due to the deviation from the optical axis.

In addition, according to the atomic structure of the experimental sample, the function of the emergent wave is simulated, and then corresponding simulation image is obtained by changing any aberration value through the designed software. In this procedure, it is necessary to compare the output simulation image using the human eyes in order that it is consistent with the experimental image. Because the comparison is made by the human eyes, it takes a lot of time and depends on the familiarity of the user of the software with the parameters of the electron microscope.

When the resolution of the researched crystal structure reaches the atomic scale, the aberration value will influence the imaging effect, and only when the aberration is accurately determined, it is possible to interpret the image, adjust the aberration and eliminate the aberration with other later calculation methods.

In order to solve one or more of the above problems, the present disclosure provides a method for determining an electron microscope aberration. FIG. 1 is a schematic flowchart of a method for determining an electron microscope aberration according to an embodiment of the present disclosure. As illustrated in FIG. 1, the method for determining the electron microscope aberration according to some embodiments may comprise:

S110: training a neural network for image recognition using a plurality of electron microscope simulation images to obtain an electron microscope image recognition model, wherein each of the electron microscope simulation images is corresponding to a respective set aberration;

S120: recognizing an electron microscope image of an experimental sample using the electron microscope image recognition model to obtain the electron microscope simulation image corresponding to the electron microscope image of the experimental sample, wherein the electron microscope simulation image and the electron microscope image of the experimental sample are both images of set type;

S130: obtaining the corresponding set aberration as an imaging aberration of the electron microscope image of the experimental sample according to the electron microscope simulation image corresponding to the electron microscope image of the experimental sample.

In the above step S110, the electron microscope simulation image may be an image calculated by a computer simulation electron microscope system under the condition of set aberration for a sample with a complete lattice structure. The electron microscope system may be a transmission electron microscope, including an electron gun, an objective lens, an intermediate mirror, etc. In this case, the electron microscope simulation image may be a high-resolution image or any other electron microscope image that needs to reach the atomic scale. The electron microscope simulation image may be a transmission electron microscope simulation image. In other embodiments, where possible, the electron microscope system may be other types of electron microscopes, such as a scanning electron microscope, in which case the electron microscope simulation image may be a scanning electron microscope image. Generally, the number of the electron microscope simulation images is multiple, which may be massive and reach hundreds of thousands, such as 500,000.

Various parameters, such as different aberrations and different sample parameters, may be set when the electron microscope simulation images are obtained. The set aberration may be an aberration range, and may be specific to several orders of aberration. The sample parameters may include material, crystal lattice type, crystal orientation, sample thickness, etc., wherein the material for example is monolayer BN, $MoS_2$, graphene, metal sample, etc., and the sample thickness may be monolayer, multi-layer, etc. In some embodiments, a plurality of electron microscope simulation images may be generated each time for a specific material to train the neural network for image recognition, so as to obtain an electron microscope image recognition model for the specific material, so that the trained model is more targeted. The various parameters set when the electron microscope simulation images are obtained may be used as labels thereof to mark the electron microscope simulation images. Different electron microscope simulation images may be corresponding to a same or different set aberrations, and the electron microscope simulation images and the set aberrations or aberration parameters may be stored correspondingly in the form of a table, in which markers such as serial numbers, names, identity codes, etc. may be added to the electron microscope simulation images.

The neural network for image recognition may be a newly constructed network or a trained neural network (with certain network parameters), and the types thereof may be various convolution neural networks capable of image recognition. In the training of the neural network for image recognition using a plurality of electron microscope simulation images, the electron microscope simulation images are directly input to the neural network for training.

In the above step S120, the images of set type may be high-resolution images, and the electron microscope simulation image and the electron microscope image of the experimental sample may be both high-resolution images. The electron microscope simulation images may be corresponding to a same material, and the experimental sample may contain the material. For example, the electron microscope simulation images are simulation images corresponding to molybdenum disulfide, and the experimental sample may be that made of molybdenum disulfide material, so that the measured aberration can be more accurate. The electron microscope simulation image corresponding to the obtained electron microscope image of the experimental sample is a target simulation image. The electron microscope image recognition model may find an electron microscope simulation image most similar to the electron microscope image of the experimental sample by comparing the similarities between the electron microscope image of the experimental sample and the above electron microscope simulation images, so as to recognize it as the target simulation image.

In the above step S130, after obtaining the target simulation image (i.e., the electron microscope simulation image corresponding to the electron microscope image of the experimental sample), corresponding aberration value may be found by looking up a corresponding relationship between the electron microscope simulation image and the set aberration, such as a correspondence table. According to the relationship between the randomly generated electron microscope simulation image and an aberration corresponding thereto, the aberration of the electron microscope image of the experimental sample can be found.

In this embodiment, an electron microscope image recognition model is obtained by training the neural network for image recognition using a plurality of electron microscope simulation images, a target electron microscope simulation image is obtained by recognizing the electron microscope image of an experimental sample using the electron microscope image recognition model, and an aberration of the electron microscope image of the experimental sample is obtained according to an aberration corresponding to the target electron microscope simulation image, so that an aberration value of the electron microscope can be obtained using a lattice image of the experimental sample for aberration correction. Therefore, it avoids the problem of the inaccurate aberration measurement caused by the necessity of replacing or moving the sample due to the aberration correction using non-crystal areas, and it may also avoid the problem of inaccuracy of the measurement value of the non-crystal areas caused by different aberration values corresponding to different areas. Therefore, this solution can improve the imaging effect of the electron microscope.

In some embodiments, in the above step S110, training a neural network for image recognition using a plurality of electron microscope simulation images to obtain an electron microscope image recognition model may comprise:

S111: performing feature extraction on the electron microscope simulation images to obtain image features;

S112: performing cluster analysis on all of the image features to classify all of the electron microscope simulation images to obtain the classified electron microscope simulation images which are corresponding to respective categories;

S113: training the neural network for image recognition using the classified electron microscope simulation images based on set network parameters, set network hyper-parameters and a set loss function, to obtain the electron microscope image recognition model.

In the above step S111, the feature extraction may be performed on the electron microscope simulation images through the neural network, and a series of numerical images with a certain size may be obtained after the feature extraction. One image feature may be correspondingly obtained from one electron microscope simulation image. Specifically, for example, the step S110 may comprise: performing the feature extraction on the electron microscope simulation images using the neural network based on set network parameters, to obtain the image features. The network structure of the neural network used here may be of Inception series, such as Inception v3, Inception v4, etc. The set network parameters here may be those obtained by training a newly constructed network, or those obtained by parameter transfer based on initial network parameters resultant from certain training.

A mode of generating the set network parameters may comprise: performing parameter transfer on network parameters trained based on an ImageNet data set for the images of set type to obtain the set network parameters, by which, the time taken for subsequently training the network can be greatly reduced. The parameter transfer may adopt an existing parameter transfer method.

In the above step S112, the clustering analysis may be performed in an unsupervised learning method, such as a K-Means method (k-means clustering method). In some embodiments, before performing the clustering analysis on all of the image features to classify all of the electron microscope simulation images (e.g., 500,000 electron microscope images), some electron microscope simulation images (e.g., 5,000 electron microscope images) may be randomly selected from all of the electron microscope simulation images, and cluster analysis may be performed according to a set number of categories, so as to find a suitable number of categories (e.g., 15 categories). Next, according to the suitable number of categories and the extraction ratio of images (e.g., 500,000/5000=100), the number of categories (e.g., 15*100=1500) that should be set for all of the electron microscope simulation images is obtained. Finally, cluster analysis is performed on all of the image features according to the obtained number of categories that should be set for all of the electron microscope simulation images, thus classifying all of the electron microscope simulation images. By determining the number of categories in advance, the electron microscope simulation images can be classified more appropriately. After all of the simulation images are classified, each of the electron microscope simulation images may be corresponding to one category, and a plurality of electron microscope simulation images may be corresponding to a same category, i.e., there may be a plurality of electron microscope simulation images in one category, and in other words, each of the electron microscope simulation images may be corresponding to a respective category. The electron microscope simulation images, the image features and the categories may have corresponding relationships and may be stored in the form of a table.

In the above step S113, the set network parameters may be artificially set initial parameters or network parameters obtained after certain training, for example may be those obtained by the parameter transfer on the network parameters trained based on the ImageNet data set for the above images of set type. The parameter transfer method may be the existing method. The ImageNet data set may include images of animals, plants, human faces, etc., and network parameters more suitable for the electron microscope images may be obtained by the parameter transfer. Specifically, the parameter transfer method may comprise: taking the network parameters trained based on the ImageNet data set as original parameters of the neural network, and training the network using the electron microscope simulation images, so as to obtain the network parameters suitable for the electron microscope images. The set network parameters may be obtained by the parameter transfer method according to the network parameters trained based on the ImageNet data set, thereby greatly saving the time for obtaining the network parameters.

The set network hyper-parameters mean the parameters need to be artificially set or controlled. The set network parameters, the set network hyper-parameters and the set loss function are taken as inputs of the neural network, and the neural network for image recognition is trained using the classified electron microscope simulation images, so as to optimize the loss function and the network hyper-parameters of the neural network.

In the above step S113, when the neural network is trained, better network parameters, network hyper-parameters, loss functions, etc. may be obtained by comparing the similarities between the image features. Specifically, the similarities between the categories may be compared firstly to find a most similar category, then the similarities between the electron microscope simulation images in the found category may be compared to finally find a most similar electron microscope simulation image for network training. Generally, the similarity between two electron microscope simulation images of a same category should be higher than that between two image features of different categories. In this way, the training of the neural network can be completed more quickly. The set network parameters used in this step S113 may be the same as those used in the above step S113.

In this embodiment, by performing feature extraction on the electron microscope simulation images and then performing network training, a recognition result of the trained neural network is more accurate. By performing cluster analysis on the image features first and then training the obtained neural network, the training of the neural network can be completed as soon as possible, and the time consumed by the neural network can be reduced. In this case, every time an experimental sample needs to be observed with an electron microscope, a corresponding neural network may be trained according to the information of the experimental sample (such as material and thickness) to recognize an aberration, so that the aberration correction effect of the electron microscope image of the experimental sample can be better.

In some embodiments, in a case of performing image feature extraction and cluster analysis on the electron microscope simulation image, the above step S120, i.e., recognizing an electron microscope image of an experimental sample using the electron microscope image recognition model to obtain the electron microscope simulation image corresponding to the electron microscope image of the experimental sample may comprise:

S121: performing category recognition on the electron microscope image of the experimental sample using the electron microscope image recognition model to obtain the category corresponding to the electron microscope image of the experimental sample;

S122: performing image recognition in the category corresponding to the electron microscope image of the experimental sample using the electron microscope image recognition model to obtain the electron microscope simulation image corresponding to the electron microscope image of the experimental sample.

In the above step S121, a certain category of image features or electron microscope simulation images may correspond to a category center, and a distance between an image to be recognized (an electron microscope image of an experimental sample) and the category center may be calculated to recognize the category of image features or electron microscope simulation images to which the image to be recognized is most similar, and the image to be recognized belongs to that recognized category. The corresponding relationship between the image feature and the category may be obtained from the above step S112. In the above step S122, after the most similar category is recognized, an electronic microscope simulation image most similar to the image to be recognized may be recognized by comparing the similarities between the image to be recognized and the electronic microscope simulation images in the recognized category. In the above step S122, after the most similar electron microscope simulation image is found, an aberration of the image to be recognized may be obtained by looking up the corresponding relationship between the electron microscope simulation image and the aberration, wherein, the corresponding relationship between the electron microscope simulation image and the aberration may be obtained from the above step S110.

In this embodiment, the recognition time can be greatly saved by recognizing the category first and then recognizing the image. In the above step S113, the neural network may be trained in a method similar to this embodiment.

Based on the same invention concept as the method for determining the electron microscope aberration described in each of the above embodiments, an embodiment of the present disclosure further provides a method for eliminating an electron microscope aberration. The method for eliminating the electron microscope aberration according to some embodiments may comprise:

S310: determining an imaging aberration of an electron microscope image of an experimental sample using the method for determining the electron microscope aberration described in each of the above embodiments;

S320: eliminating an aberration in the electron microscope image of the experimental sample according to the imaging aberration.

The specific implementation of the above step S310 may be carried out with reference to the specific implementation of the method for determining the electron microscope aberration described in each of the above embodiments, and the detailed description is omitted. In the above step S320, in a case where objective lens-related current may be adjusted using a Cs-corrector, the objective lens-related current may be adjusted by adjusting the Cs-corrector according to the obtained imaging aberration, so as to achieve the purpose of eliminating the aberration. Or, after the imaging aberration is obtained, the influence of the aberration contained in the experimental image may be eliminated using a calculation method for image processing.

In this embodiment, when an electron microscope image of an experimental crystal sample is shot, an imaging aberration may be obtained and then is eliminated based on the obtained imaging aberration without replacing or moving the sample. For example, when a lattice image (high-resolution image) of an experimental sample is observed, it is possible to obtain an aberration thereof in an observation area of the lattice image and then eliminate the aberration, without moving to a non-crystal area or replacing the sample, which can avoid the problem that the imaging effect is not ideal due to the inaccurate aberration measurement caused by unstable current, material difference and other reasons.

In order that persons skilled in the art can better understand the present disclosure, the embodiment of the present disclosure will be explained below with a specific embodiment.

Figure 2:
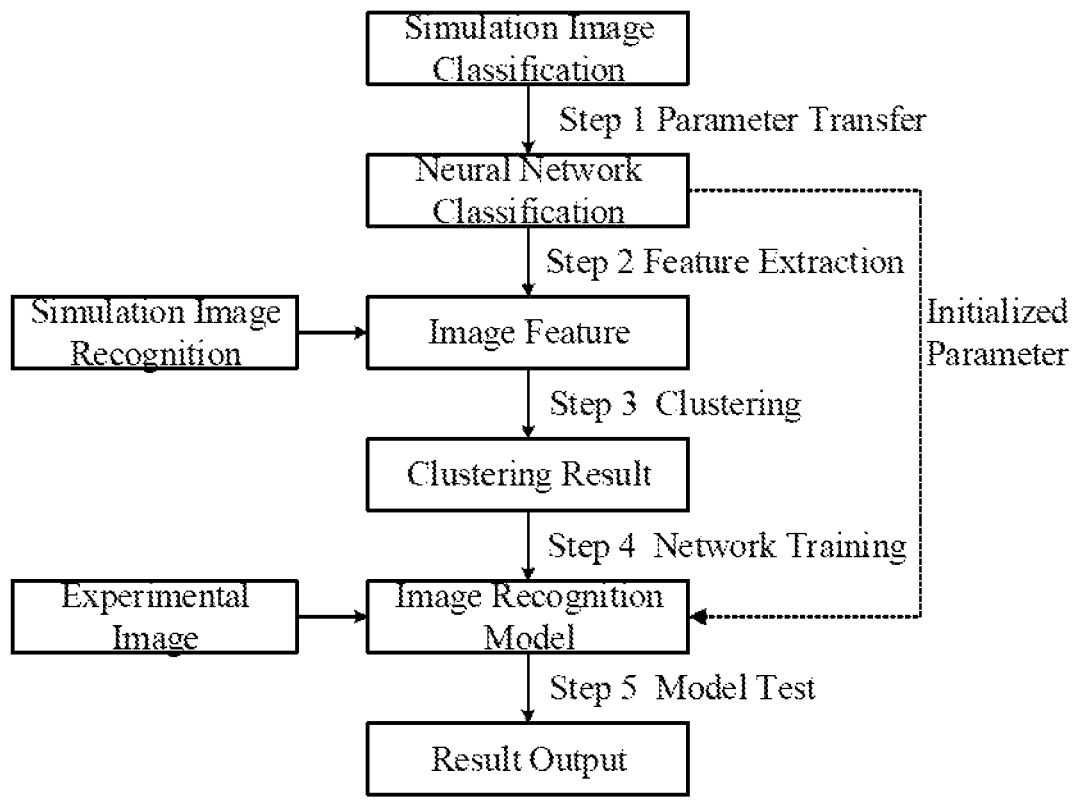
FIG. 2 is a schematic flowchart of a method for eliminating an electron microscope aberration according to an embodiment of the present disclosure.

With respect to the problem existing in the prior art, an aberration value of an electron microscope is calculated with an algorithm directly in a complete crystal area of an object to be measured under a high-resolution imaging mode of a transmission electron microscope. Specifically, a method combining traditional machine learning with deep learning is proposed to solve the problem. A large number of electron microscope simulation images are generated as a data set, and then a neural network for electron microscope image recognition is trained using the data set. FIG. 2 is a schematic flowchart of a method for eliminating an electron microscope aberration according to an embodiment of the present disclosure. Referring to FIG. 2, the specific method flow may comprise:

(1) Optimizing network parameters by transfer learning. In order to better extract image features of an electron microscope, network parameters trained based on an ImageNet data set may be optimized in a parameter transfer method, and the data set may use multiple categories of data generated by controlling 1 to 2 imaging parameters. The parameter transfer is performed for the parameters of the whole network, that is, under the condition of using the electron microscope images as the data set, the parameters of the whole network will change as the data set changes. Experiments show that the classification accuracy is improved to a certain extent after the optimization by transfer.

(2) Extracting simulation image features for image recognition. Before the recognized simulation images are clustered, the image features should be extracted using the network parameters after the parameter transfer. For example, Inception v3 (a network structure of the convolutional neural network) is used to extract the image features in various simulation images, wherein, just by removing the classification layer of the network and saving the fully connected data, the image features input to the network are obtained.

(3) Clustering the simulated images. Since the generated data for recognizing simulation images is of a large magnitude (usually millions of images), in order to reduce the data scale, the unsupervised clustering method in the traditional machine learning is adopted to reduce the data volume by several orders of magnitude. For example, the K-means method may be adopted for clustering. For example, 1 million feature images may be clustered into 1,500 categories, i.e., the neural network can be trained by reducing the dimensions.

(4) Training the electron microscope image recognition model based on the neural network. After the data set is obtained by the unsupervised clustering method, the neural network may be constructed. Except that the network parameters of the last layer are random parameters, other network parameters are initialized to the parameters after the parameter transfer, and the network hyper-parameters are optimized, so as to train a network model for electron microscope image recognition.

(5) Testing the model. The generated experimental image is input to the trained model, and a target simulation image is obtained according to the output result of the model, and imaging parameters are also obtained. If the test result meets the requirement, the aberration of the experimental image may be recognized using the trained model, so as to eliminate the aberration.

In this embodiment, with respect to several possible atomic structures in the complete lattice area of the material to be researched, the aberration values are changed randomly or in a fixed interval to generate a large number of imaging conditions, a large number of simulated high-resolution electron microscopy images are generated as a data set, and the neural network is trained to calculate the electrical aberration value in the experimental image, which can solve the problem of calculating imaging conditions of the electron microscope from the high-resolution electron microscopy images of complete lattice. The achieved advantageous effects may include: in the experiment, the aberration value is calculated according to the imaging features of the area to be measured, and the user may adjust the related current of the Cs-corrector according to the aberration value to achieve an optimal imaging effect; in the post-processing of the image, the aberration value is obtained using the trained neural network according to the experimental image of complete lattice, then the aberration of each order is eliminated using an algorithm to improve the image resolution, and this calculation method may be adopted to research the atomic structure of the defect area; a large number of high-resolution images of crystals with different thicknesses are simulated, and the thicknesses of the crystals are determined while determining the astigmatism conditions of the electron microscope.

Based on the same invention concept as the method for determining the electron microscope aberration illustrated in FIG. 1, an embodiment of the present application further provides an apparatus for determining an electron microscope aberration as described in the following embodiment. Since the problem solving principle of the apparatus for determining the electron microscope aberration is similar to that of the method for determining the electron microscope aberration, the implementation of the apparatus for determining the electron microscope aberration may refer to the implementation of the method for determining the electron microscope aberration, and the repeated content is omitted.

Figure 3:
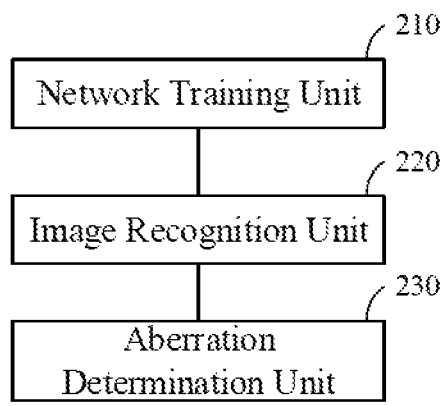
FIG. 3 is a schematic structural diagram of an apparatus for determining an electron microscope aberration according to an embodiment of the present disclosure.

FIG. 3 is a schematic structural diagram of an apparatus for determining an electron microscope aberration according to an embodiment of the present disclosure. As illustrated in FIG. 3, the apparatus for determining the electron microscope aberration according to some embodiments may comprise:

a network training unit 210 configured to train a neural network for image recognition using a plurality of electron microscope simulation images to obtain an electron microscope image recognition model, wherein each of the electron microscope simulation images is corresponding to a respective set aberration;

an image recognition unit 220 configured to recognize an electron microscope image of an experimental sample using the electron microscope image recognition model to obtain the electron microscope simulation image corresponding to the electron microscope image of the experimental sample, wherein the electron microscope simulation image and the electron microscope image of the experimental sample are both images of set type; and an aberration determination unit 230 configured to obtain the corresponding set aberration as an imaging aberration of the electron microscope image of the experimental sample according to the electron microscope simulation image corresponding to the electron microscope image of the experimental sample.

The apparatus for determining the electron microscope aberration may be a storage medium, a computer device, an electron microscope device, etc. containing a program module capable of realizing the above functions.

An embodiment of the present disclosure further provides a computer readable storage medium in which a computer program is stored, wherein when being executed by a processor, the program implements steps of the method described in the above embodiments.

An embodiment of the present disclosure further provides an electron microscope, comprising a memory, a processor, and a computer program stored in the memory and executable in the processor, wherein the processor implements steps of the method described in the above embodiments when executing the program. The electron microscope may be a transmission electron microscope.

To sum up, in the method for determining the electron microscope aberration, the method for eliminating the electron microscope aberration, the apparatus for determining the electron microscope aberration, the electron microscope and the computer readable storage medium according to the embodiments of the present disclosure, the recognition result of the trained neural network is more accurate by training the network after performing the feature extraction on the electron microscope simulation images. By performing the clustering analysis on the images and then training the neural network, the training of the neural network can be completed as soon as possible and the time consumed by the neural network can be reduced. In the test, the method of the embodiment takes only a few minutes. In this case, every time an experimental sample needs to be observed with an electron microscope, a corresponding neural network may be trained according to the information of the experimental sample (e.g., material and thickness) to recognize the aberration, so that the aberration correction effect of the electron microscope image of the experimental sample can be better.

In the description of the present disclosure, the description of reference terms 'one embodiment', 'one specific embodiment' 'some embodiments', 'for example', 'an example', 'a specific example' or 'some examples' and the like mean that the specific features, structures, materials, or characteristics described in conjunction with the embodiment(s) or example(s) are comprised in at least one embodiment or example of the present disclosure. In the present disclosure, the schematic expressions of the above terms do not necessarily refer to the same embodiment or example. Moreover, the specific features, structures, materials, or characteristics described may be combined in any one or more embodiments or examples in a suitable manner. The sequence of the steps involved in each of the embodiments is used to schematically illustrate the implementation of the present disclosure, wherein the sequence of the steps is not limited and can be appropriately adjusted as required Persons skilled in the art should appreciate that the embodiments of the present disclosure may be provided as a method, a system, or a computer program product. Thus, the present disclosure may adopt the form of a complete hardware embodiment, a complete software embodiment, or a software and hardware combined embodiment. In addition, the present disclosure may adopt the form of a computer program product which is implementable in one or more computer readable storage mediums (including, but not limited to, a magnetic disk memory, a CD-ROM, an optical memory, a graphics card, etc.) containing computer readable program codes therein.

The present disclosure is described with reference to a flowchart and/or a block diagram of the method, apparatus (system) and computer program product according to the embodiments of the present disclosure. It should be appreciated that each flow and/or block in the flowchart and/or the block diagram and a combination of flows and/or blocks in the flowchart and/or the block diagram can be implemented by computer program instructions. Those computer program instructions may be provided to a general computer, a dedicated computer, an embedded processor or a processor of other programmable data processing device to form a machine, so that means for realizing the functions specified in one or more flows in the flowchart and/or one or more blocks in the block diagram are produced by the instructions, which are executed by the processor of the computer or other programmable data processing device.

These computer program instructions may also be stored in a computer readable memory capable of guiding the computer or other programmable data processing devices to work in a particular manner, so that the instructions stored in the computer readable memory can produce a product including instructing means for realizing the function(s) specified in one or more flows in the flowchart and/or one or more blocks in the block diagram.

These computer program instructions may also be loaded onto the computer or other programmable data processing devices, so that a series of operation steps can be performed in the computer or other programmable device to produce a processing realized by the computer, thus the instructions executed in the computer or other programmable devices provide the step(s) for realizing the function(s) specified in one or more flows in the flowchart and/or one or more blocks in the block diagram.

The specific embodiments described above further make detailed explanations to the objectives, technical solutions and advantageous effects of the present disclosure. It should be understood that those described above are only specific embodiments of the present disclosure and are not intended to limit the protection scope of the present disclosure. Any modification, equivalent substitution or improvement made within the spirit and principle of the present disclosure should fall within the protection scope of the present disclosure.

The invention claimed is:

1. A method for determining an electron microscope aberration, comprising:
    training a neural network for image recognition using a plurality of electron microscope simulation images to obtain an electron microscope image recognition model, wherein each of the electron microscope simulation images is corresponding to a respective set aberration;
    recognizing an electron microscope image of an experimental sample using the electron microscope image recognition model to obtain the electron microscope simulation image corresponding to the electron microscope image of the experimental sample, wherein the electron microscope simulation image and the electron microscope image of the experimental sample are both images of set type; and
    obtaining the corresponding set aberration as an imaging aberration of the electron microscope image of the experimental sample according to the electron microscope simulation image corresponding to the electron microscope image of the experimental sample.

2. The method for determining the electron microscope aberration according to claim 1, wherein training a neural network for image recognition using a plurality of electron microscope simulation images to obtain an electron microscope image recognition model comprises:
    performing feature extraction on the electron microscope simulation images to obtain image features;
    performing cluster analysis on all of the image features to classify all of the electron microscope simulation images; the classified electron microscope simulation images being corresponding to respective categories; and
    training the neural network for image recognition using the classified electron microscope simulation images based on set network parameters, set network hyper-parameters and a set loss function, to obtain the electron microscope image recognition model.

3. The method for determining the electron microscope aberration according to claim 2, wherein before training the neural network for image recognition using the classified electron microscope simulation images based on set network parameters, set network hyper-parameters and a set loss function, to obtain the electron microscope image recognition model, the method further comprises:
performing parameter transfer on network parameters trained based on an ImageNet data set for the images of set type to obtain the set network parameters.

4. The method for determining the electron microscope aberration according to claim 3, wherein performing feature extraction on the electron microscope simulation images to obtain image features comprises:
performing the feature extraction on the electron microscope simulation images using the neural network based on the set network parameters, to obtain the image features.

5. The method for determining the electron microscope aberration according to claim 2, wherein recognizing an electron microscope image of an experimental sample using the electron microscope image recognition model to obtain the electron microscope simulation image corresponding to the electron microscope image of the experimental sample comprises:
performing category recognition on the electron microscope image of the experimental sample using the electron microscope image recognition model to obtain the category corresponding to the electron microscope image of the experimental sample; and
performing image recognition in the category corresponding to the electron microscope image of the experimental sample using the electron microscope image recognition model to obtain the electron microscope simulation image corresponding to the electron microscope image of the experimental sample.

6. The method for determining the electron microscope aberration according to claim 1, wherein
the images of set type are high-resolution images; and/or
the electron microscope simulation images are transmission electron microscope simulation images; and/or
all of the electron microscope simulation images are simulation images corresponding to a same material contained in the experimental sample.

7. A method for eliminating an electron microscope aberration, comprising:
determining an imaging aberration of an electron microscope image of an experimental sample using the method for determining the electron microscope aberration according to claim 1; and
eliminating an aberration in the electron microscope image of the experimental sample according to the imaging aberration.

8. The method for eliminating the electron microscope aberration according to claim 7, wherein training a neural network for image recognition using a plurality of electron microscope simulation images to obtain an electron microscope image recognition model comprises:
performing feature extraction on the electron microscope simulation images to obtain image features;
performing cluster analysis on all of the image features to classify all of the electron microscope simulation images; the classified electron microscope simulation images being corresponding to respective categories; and
training the neural network for image recognition using the classified electron microscope simulation images based on set network parameters, set network hyper-parameters and a set loss function, to obtain the electron microscope image recognition model.

9. The method for eliminating the electron microscope aberration according to claim 8, wherein before training the neural network for image recognition using the classified electron microscope simulation images based on set network parameters, set network hyper-parameters and a set loss function, to obtain the electron microscope image recognition model, the method further comprises:
performing parameter transfer on network parameters trained based on an ImageNet data set for the images of set type to obtain the set network parameters.

10. The method for eliminating the electron microscope aberration according to claim 9, wherein performing feature extraction on the electron microscope simulation images to obtain image features comprises:
performing the feature extraction on the electron microscope simulation images using the neural network based on the set network parameters, to obtain the image features.

11. The method for eliminating the electron microscope aberration according to claim 8, wherein recognizing an electron microscope image of an experimental sample using the electron microscope image recognition model to obtain the electron microscope simulation image corresponding to the electron microscope image of the experimental sample comprises:
performing category recognition on the electron microscope image of the experimental sample using the electron microscope image recognition model to obtain the category corresponding to the electron microscope image of the experimental sample; and
performing image recognition in the category corresponding to the electron microscope image of the experimental sample using the electron microscope image recognition model to obtain the electron microscope simulation image corresponding to the electron microscope image of the experimental sample.

12. The method for eliminating the electron microscope aberration according to claim 7, wherein
the images of set type are high-resolution images; and/or
the electron microscope simulation images are transmission electron microscope simulation images; and/or
all of the electron microscope simulation images are simulation images corresponding to a same material contained in the experimental sample.

13. A non-transitory computer readable storage medium in which a computer program is stored, wherein when being executed by a processor, the program implements steps of the method according to claim 1.

14. The non-transitory computer readable storage medium according to claim 13, wherein when being executed by a processor, the program also implements steps of:
eliminating an aberration in the electron microscope image of the experimental sample according to the imaging aberration.

* * * * *